(12) United States Patent
Kojima (10) Patent No.: US 9,282,212 B2
(45) Date of Patent: Mar. 8, 2016

(54) IMAGE PROCESSING APPARATUS, INFORMATION PROCESSING METHOD AND STORAGE MEDIUM

(71) Applicant: CANON KABUSHIKI KAISHA, Tokyo (JP)

(72) Inventor: Nobuyuki Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/286,134

(22) Filed: May 23, 2014

(65) Prior Publication Data
US 2014/0355023 A1    Dec. 4, 2014

(30) Foreign Application Priority Data
Jun. 4, 2013    (JP) .................................. 2013-117802

(51) Int. Cl.
G06F 15/00    (2006.01)
H04N 1/00    (2006.01)

(52) U.S. Cl.
CPC ......... *H04N 1/0097* (2013.01); *H04N 1/00474* (2013.01); *H04N 1/00912* (2013.01); *H04N 1/00917* (2013.01); *H04N 2201/0094* (2013.01)

(58) Field of Classification Search
CPC ................... H04N 2201/0094; H04N 1/00912
USPC ......................................... 358/1.13
See application file for complete search history.

(56) References Cited

U.S. PATENT DOCUMENTS

2002/0018227 A1*  2/2002  Asahi .................. B41J 13/0036
                                                       358/1.13
2014/0047554 A1    2/2014  Kojima .......................... 726/27

FOREIGN PATENT DOCUMENTS

JP    2008-273126 A    11/2008

* cited by examiner

*Primary Examiner* — Saeid Ebrahimi Dehkordy
(74) *Attorney, Agent, or Firm* — Fitzpatrick, Cella, Harper & Scinto (57) ABSTRACT

An object of the present invention is to exclusively enable both a resume function and an auto-clear function. To achieve the object, there are provided a resume unit configured to reproduce setting based on stored setting information, an auto-clear unit configured to clear the setting information, and a switching unit configured to switch from an operation of enabling either one of the resume unit and the auto-clear unit to an operation of enabling the other of the resume unit and the auto-clear unit.

7 Claims, 11 Drawing Sheets

IMAGE PROCESSING APPARATUS, INFORMATION PROCESSING METHOD AND STORAGE MEDIUM

BACKGROUND OF THE INVENTION

1. Field of the Invention

The present invention relates to an image processing apparatus, an information processing method, and a storage medium of storing a program for performing the image processing method.

2. Description of the Related Art

Recently, functions of a multifunction image processing apparatus have increased more and more. According to such an increase of the functions, setting items to be used for adjusting the respective functions have increased, and also operations necessary for the setting items have increased. Thus, when the same operation is repeated, it is necessary to repeat the same setting every time the same operation is performed, thereby giving inconvenience to a user.

Here, there is a custom menu function capable of registering a set state and calling the registered set state. However, in the custom menu function, since the user has to take the trouble to register the set state, it is difficult for the user who is unfamiliar with the image processing apparatus to perform customization.

In general, the user often performs the operation with the setting same as that in the previous operation. Consequently, a resume function has been proposed as a means for more easily performing the operation (Japanese Patent Application Laid-Open No. 2008-273126). Here, the resume function is the function for eliminating the user's registration of the setting by automatically storing the latest set state in the previous operation, thereby reproducing the previously stored set state when the user again performs the operation.

On the other hand, there is a function (called an auto-clear function, hereinafter) for clearing the set state by initializing a user interface screen when the operation is not performed for a certain period of time. Here, the auto-clear function is the function for preventing inconvenience that a current user who improperly takes over the set state given by a previous user performs the operation with the previous setting not supposed, inconvenience that set contents such as a facsimile destination, a mail destination, an address of a personal server and the like which must not be disclosed to other users for security reasons are viewed by other users, and the like.

The resume function is characterized in that the previously set content can be called, and the auto-clear function is characterized in that the set content is automatically initialized. Namely, although both the functions achieve the processes considering user-friendliness, there is a confliction between these functions. Consequently, which function the user senses convenience completely depends on the relevant user and an environment related to the relevant user.

The present invention has been completed in consideration of such a problem as described above, and aims to exclusively enable both the resume function and the auto-clear function and thus further improve user-friendliness.

SUMMARY OF THE INVENTION

Consequently, an image processing apparatus according to the present invention is characterized by comprising: a resume unit configured to reproduce setting based on stored setting information; an auto-clear unit configured to clear the setting information; and a switching unit configured to switch from an operation of enabling either one of the resume unit and the auto-clear unit to an operation of enabling the other of the resume unit and the auto-clear unit.

According to the present invention, it is possible to exclusively enable both a resume function and an auto-clear function and thus further improve user-friendliness.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings.

<First Embodiment>

Figure 1:
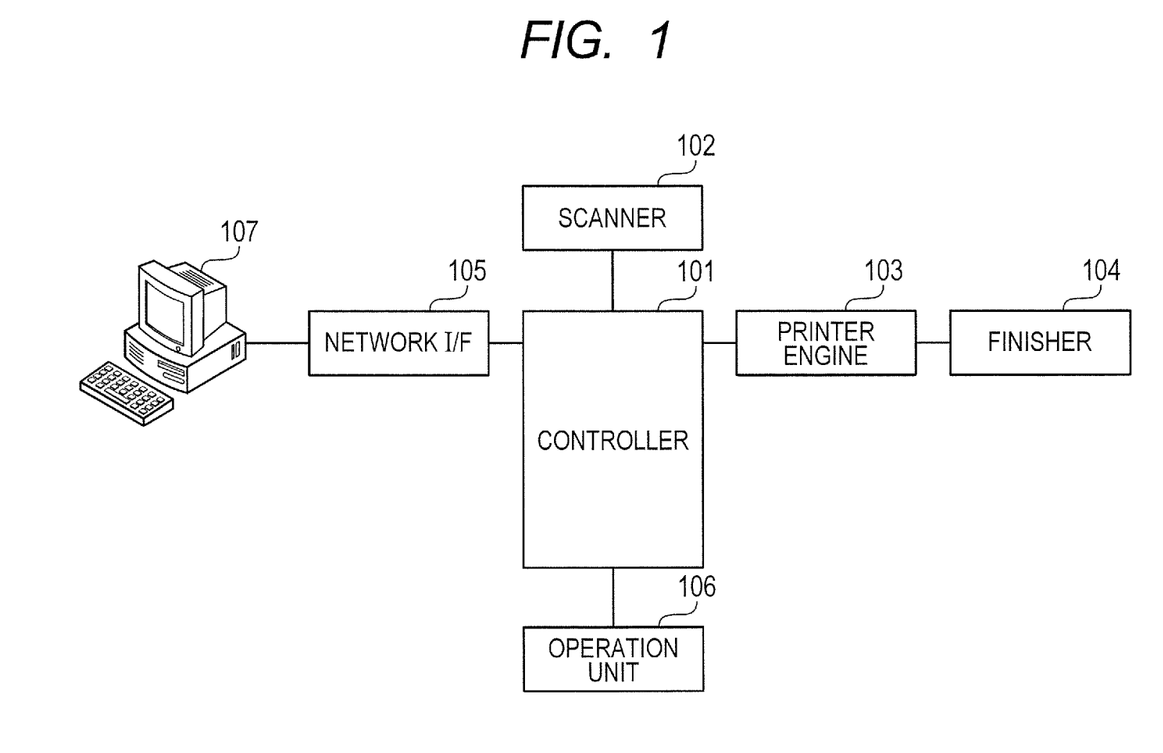
FIG. 1 is a block diagram illustrating an example of an overall configuration of a multifunction peripheral as an example of an image processing apparatus according to the present invention.

FIG. 1 is a block diagram illustrating an example of an overall configuration of an MFP (multi-function peripheral) as an example of an image processing apparatus according to the present invention.

A controller 101, which serves as the controller for controlling the MFP, has a later-described hardware constitution illustrated in FIG. 2. More specifically, a scanner 102 is controlled by the controller 101, and also a printer engine 103 is controlled by the controller 101.

The printer engine 103 is connected to a finisher 104, and the finisher 104 can perform a stapling process to a plurality of recording media (e.g., papers) in a lump output from the printer engine 103.

Also, the finisher 104 is controlled by the controller 101. A network I/F (interface) 105, which provides bidirectional communication with the controller 101, can be connected to a personal computer 107 through a network. An operation unit 106, which consists of a LCD (liquid crystal display) and a keyboard, displays information supplied from the controller 101, and transfers instructions from a user to the controller 101. Incidentally, the user can use all the functions of the MFP from any interface on the network.

Figure 2:
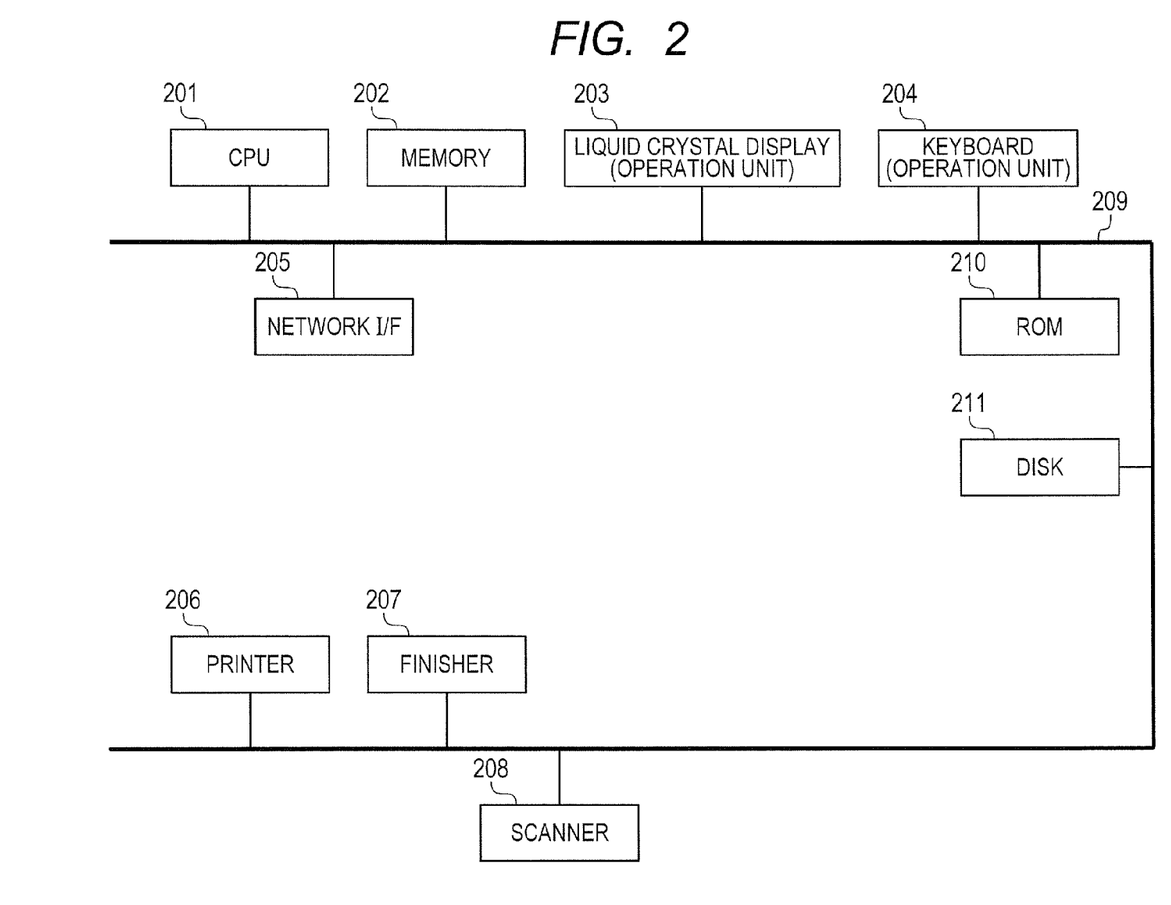
FIG. 2 is a block diagram illustrating an example of a hardware constitution of a controller.

FIG. 2 is the block diagram illustrating the hardware constitution of the controller 101.

In the controller 101, a CPU (central processing unit) 201 is connected to a memory 202, a liquid crystal display 203 and a keyboard 204 both constituting the operation unit 106, a ROM (read-only memory) 210, and a disk 211 through a bus 209.

Various programs and data have been stored in the disk 211 (a storage medium) such as a hard disk, a flexible disk or the like, and are sequentially read out to the memory 202 and then executed and processed by the CPU 201 as necessary. Here, the disk 211 may be detachable from the MFP or built into the MFP.

Further, the program may be downloaded from another MFP through the network and then stored in the disk 211.

Furthermore, as the memory, either a non-volatile memory such as a DRAM (dynamic random access memory) or a volatile memory such as an SRAM (static random access memory) is used. However, the memory 202 may have the functions of both the non-volatile memory and the volatile memory. Also, it may be possible to constitute that the memory 202 has the function of the volatile memory and the disk 211 has the function of the non-volatile memory. Further, the memory 202 may be a removable or detachable memory medium.

As described above, the liquid crystal display 203 and the keyboard 204 constitute the operation unit 106 illustrated in FIG. 1.

The CPU 201 controls to perform a display by writing the data to the liquid crystal display 203, and the CPU 201 controls to input the instruction from the user by reading the data from the keyboard 204 or the touch-panel liquid crystal display 203. Incidentally, in the following description, the liquid crystal display 203 will be also called the operation unit 203.

Input information is transferred to and stored in any one of the memory 202, the disk 211 and the CPU 201, and then used for various processes.

Incidentally, a network I/F 205, which is connected to the bus 209, corresponds to the network I/F 105 illustrated in FIG. 1. The CPU 201 controls to perform communication using the interface by reading or reading the data from or to the interface.

Furthermore, a printer 206, a finisher 207 and a scanner 208 are connected to the bus 209.

They correspond respectively to the printer engine 103, the finisher 104 and the scanner 102 illustrated in FIG. 1. The CPU 201 controls to perform engine operations such as printing, scanning and the like and acquisition of various statuses, by reading and writing the data from and to these engines.

Incidentally, image data which is transferred from the scanner 102 or the network I/F 105 can be stored in the disk 211 and/or the memory 202 in the controller 101.

Besides, the image data can be acquired by previously storing it in the detachable memory 202, and installing the relevant memory to the controller 101.

The image data stored in the disk 211 can be moved to the memory 202 or copied, and various additional images (e.g., numeral of figure portions for page printing) can be synthesized to the image data in the memory according to contents instructed from the operation unit 106.

Incidentally, each of the printer 206, the finisher 207 and the scanner 208 may be provided as a stand-alone peripheral on the network (i.e., not inside the MFP), and, in this case, may be controlled by the controller 101.

The CPU 201 performs processes based on the programs stored in the memory 202 or the like, thereby achieving later-described software configuration and processes illustrated in later-described flow charts.

Figure 3:
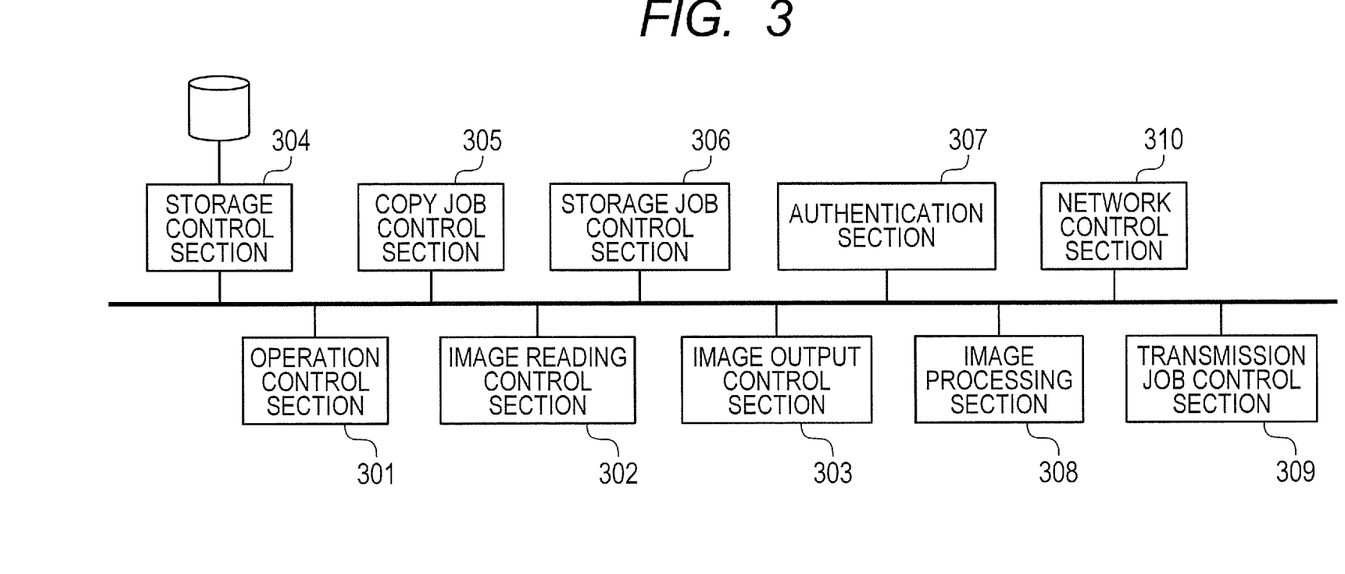
FIG. 3 is a block diagram illustrating an example of a software configuration of the image processing apparatus.

FIG. 3 is a block diagram illustrating a software configuration of the image processing apparatus.

First, printing in a copying process will be described hereinafter. The scanner 208 is equipped with a pressure plate and a sheet original reading device such as an ADF (automatic document feeder). When an original document is put and set on the pressure plate or the ADF and an original reading start button on the operation unit 203 is pressed by a user, the scanner 208 optically reads the original document put and set on the pressure plate or the ADF. When reading an original document including a plurality of pages set on the pressure plate, the scanner 208 reads the relevant original document while turns over the pages. Meanwhile, when reading the original document including the plurality of pages set on the ADF, the scanner 208 sequentially reads the pages of the set original document. At the time of reading the original document, the user can designate, on the operation unit 203, various print settings concerning imposition setting for a paper, setting for the finisher such as a stapler or the like, print output setting such as image quality or the like, and the like.

An operation control section 301 determines which operation is instructed, by displaying on the operation unit 203 screens and information necessary for the operation and receiving the information transferred by the user from the operation unit 203. When the user requests the printing in the copying process, the operation control section 301 instructs to generate the screen necessary for the printing in the copying process and display the generated screen on the operation unit 203. Therefore, since the screen for the printing in the copying process is displayed on the operation unit 203, the user puts and sets the original document on the pressure plate or the ADF, and instructs to perform the copying process. At this time, the user may simultaneously instruct the above print settings. The instruction for the copying process is transferred from the operation unit 203 to the operation control section 301. When the instruction for the copying process is received, the entity of control is transitioned from the operation control section 301 to a copy job control section 305. Since it is first necessary to read the original document, the copy job control section 305 instructs an image reading control section 302 to read the original document. The image reading control section 302 controls the scanner 208 to read the original document put and set on the pressure plate or the ADF. Incidentally, when the original document is replaced on the pressure plate, the control entity is returned from the copy job control section 305 to the operation control section 301, and the selection screen for selecting whether to read a next original document or start printing is again displayed on the operation unit 203. The read data is stored in the memory 202 or the disk 211 by a storage control section 304. Incidentally, it is determined by the image reading control section 302 in which of the memory 202 and the disk 211 the read data is stored, in accordance with various factors such as a data size, a condition as to whether or not a high-speed process is required, and the like.

Next, since it is necessary to output the read data, the copy job control section 305 instructs an image output control section 303 to print the read image stored by the storage control section 304. The image output control section 303 instructs an image processing section 308 to perform an image process to the data stored in the memory 202 or the disk 211 by the storage control section 304, with the print setting designated by the user. Here, it should be noted that the image process is, for example, an editing process to the output image such as an imposition process of imposing two original documents (pages) into one paper (i.e., 2-in-1 printing), or the like. When the image editing for the output is completed, the image processing section 308 stores the edited image data to the storage control section 304. Then, the image output control unit 303 reads the image-processed result from the memory 202 or the disk 211 by using the storage control section 304, and transfers the read image data to the printer 206. After then, the printer 206 sequentially prints and outputs the transferred image data on the papers.

Subsequently, an authentication section 307 which performs authentication will be described.

It is possible to perform the authentication for the user to use the image processing apparatus. More specifically, the screen for inputting a user name and a password is displayed on the operation unit 203 to urge the user to input his/her name and password. When such data are input by the user, the user name and the password respectively input to the operation unit 203 are transferred to the authentication section 307. The authentication section 307 checks whether or not, in the user database stored in the storage unit of the image processing apparatus, there are the user name and the password which respectively coincide with the input user name and the input password, thereby performing the authentication of the user. Incidentally, the authentication is not limited to such a method as above. Namely, another authentication method using a non-contact IC (integrated circuit) card, or the like may be used. Moreover, it is unnecessary to locally provide authentication information. For example, like an Active Directory™ service or the like, the authentication may be performed by an external authentication server. In such a case, the authentication section 307 inquires of the external authentication server as to the authentication. Incidentally, the software configuration illustrated in FIG. 3 further includes a storage job control section 306, a transmission job control section 309 and a network control section 310.

Figure 4:
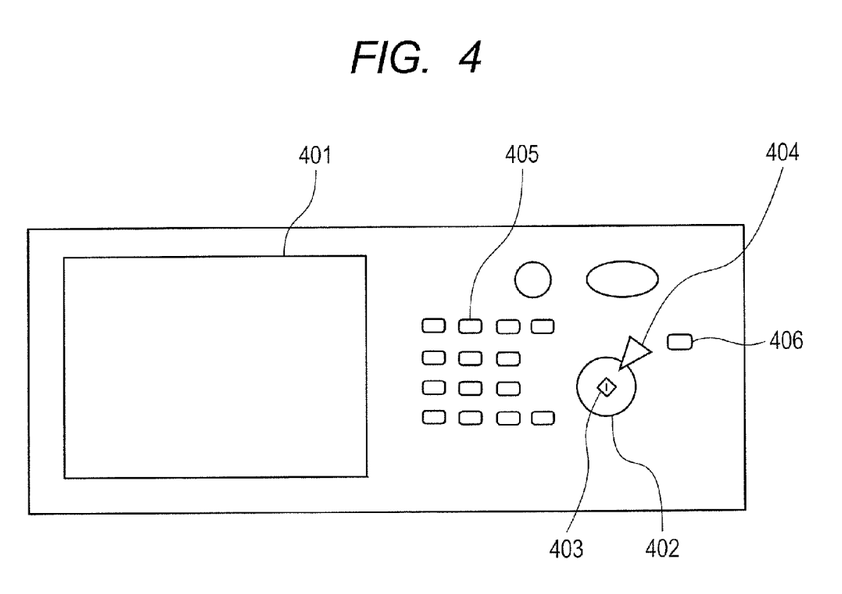
FIG. 4 is a diagram illustrating an example of an operation unit.

FIG. 4 is a diagram illustrating an example of the operation unit 203. More specifically, a liquid crystal display unit 401, on which a touch panel sheet is applied, displays system operation screens and softkeys, and, when the displayed key is pressed, transfers the position information of the pressed key to the CPU 201.

A start key 402 is used, for example, when starting the reading operation of the original image. A two-color (green and red) LED (light-emitting diode) 403 is provided at the center of the start key 402, so as to indicate whether or not to be able to use the stat key 402 according to the lighted color. A stop key 404 is used to stop a running operation.

A ten-key numerical keypad 405, which consists of a group of numerical buttons and character buttons, is used to set the number of copies and instruct a screen changeover of the liquid crystal display unit 401. A user mode key 406 is pressed when performing device setting.

Figure 5:
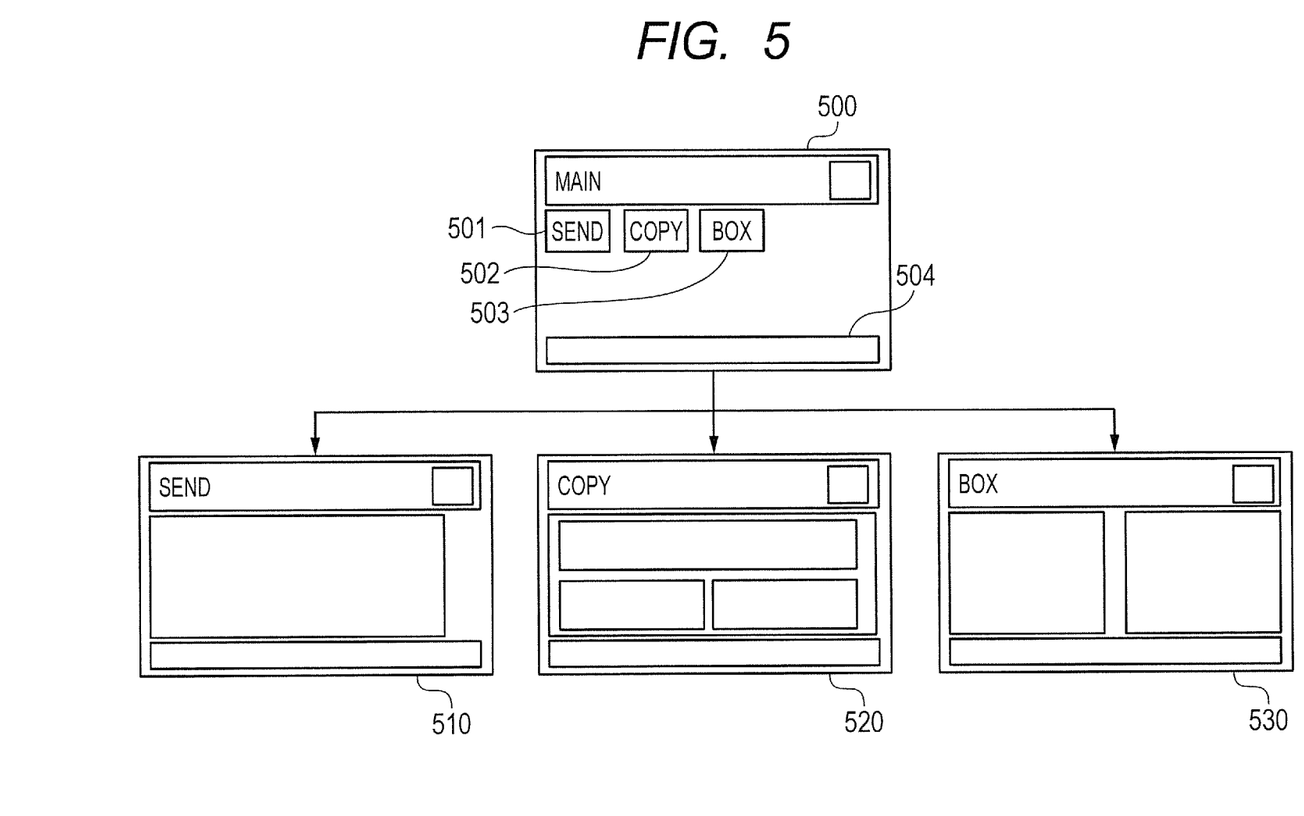
FIG. 5 is a diagram for describing an auto-clear function.

FIG. 5 is a diagram for describing an auto-clear function.

When an operation is started, the image processing apparatus displays an initial screen 500 on the liquid crystal display unit 401 of the operation unit 203. As described later, the image processing apparatus also displays the initial screen 500 even after an auto-clear operation was performed. Incidentally, buttons (501, 502, 503) for selecting respective functions, and a task bar 504 are displayed on the initial screen 500. When each of the buttons is pressed, the displayed screen is transitioned to an operation screen (510, 520, 530) corresponding to the selected and pressed button. Here, it should be noted that the function is equivalent to not only the function but also the application related to the function.

It is possible on each function screen to further call another screen for performing various detailed settings for performing the corresponding function.

Figure 6:
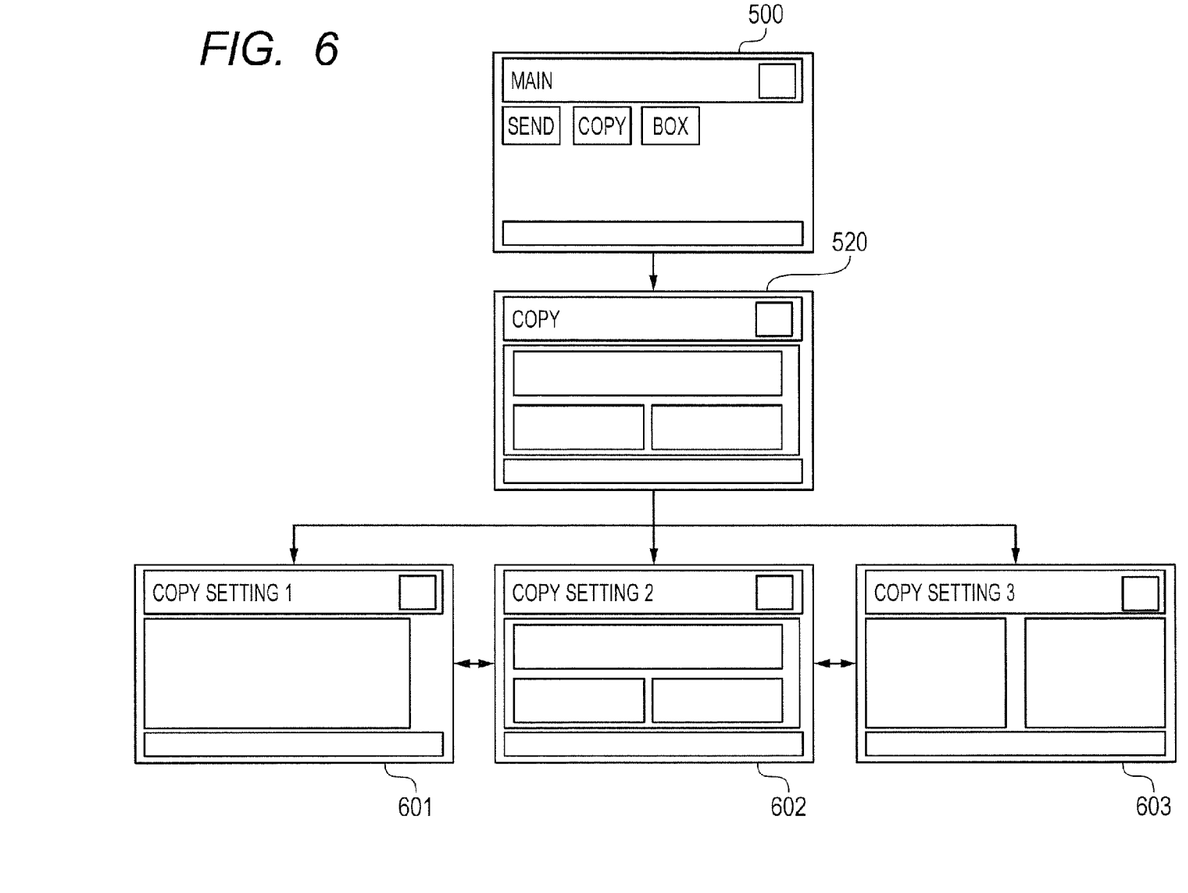
FIG. 6 is a first diagram for describing screens to be used to perform various detailed settings for performing functions.

Hereinafter, displayed states of the screens will be described with reference to FIGS. 6 and 7.

With respect to a copy function, the settings necessary for performing the copy function can be input using a plurality of setting screens, i.e., a copy setting screen 1 (601), a copy setting screen 2 (602) and a copy setting screen 3 (603). According to circumstances, it is possible to perform transition among these screens. In case of the copy job, on any of the displayed screens, it is detected that the start key 402 of the operation unit 203 is pressed, and then the job is started. After the job was completed, the displayed content of the liquid crystal display unit 401 is held as it is.

Figure 7:
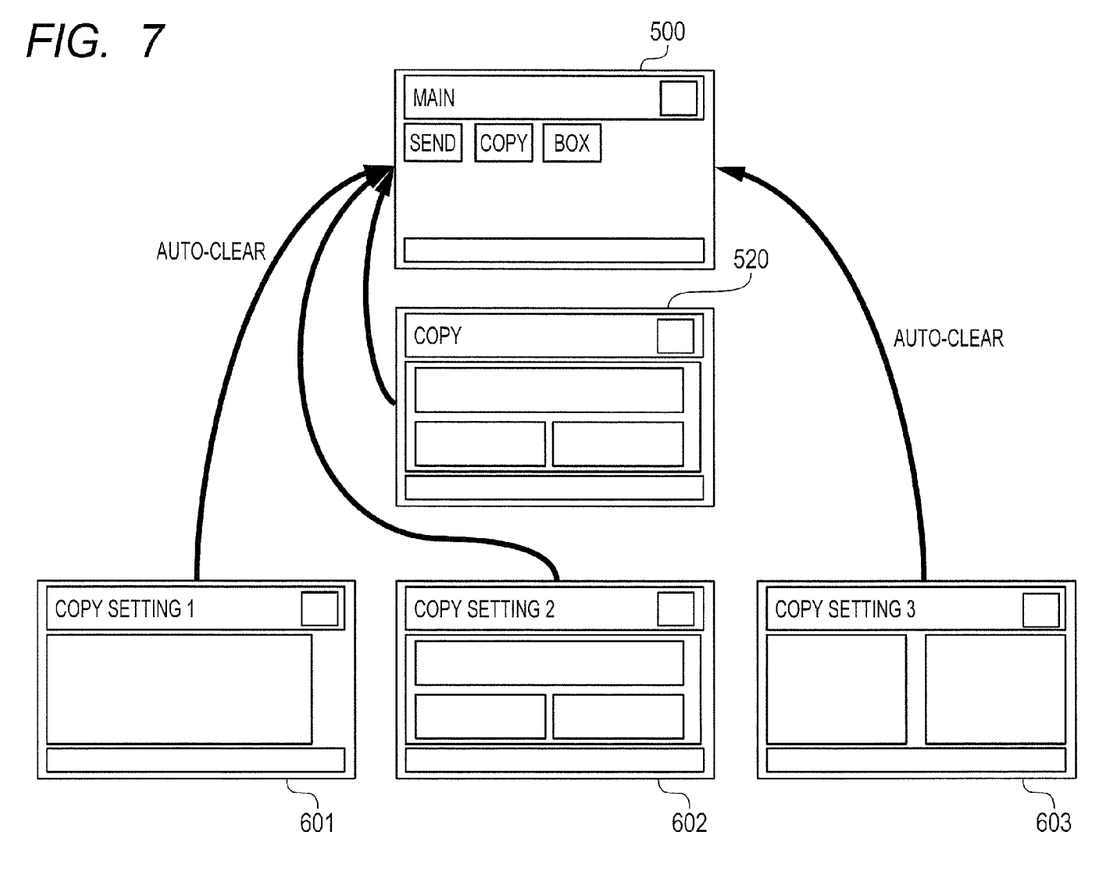
FIG. 7 is a second diagram for describing screens to be used to perform various detailed settings for performing functions.

When an operation to the operation unit 203 cannot be detected for a certain period of time or more, the image processing apparatus initializes the setting state on the screen currently displayed, and the displayed screen is automatically transitioned to the initial screen 500 (the arrows in FIG. 7 indicate the screen transitions). It should be noted that the function for transitioning to the initial screen is the auto-clear function.

Figure 8:
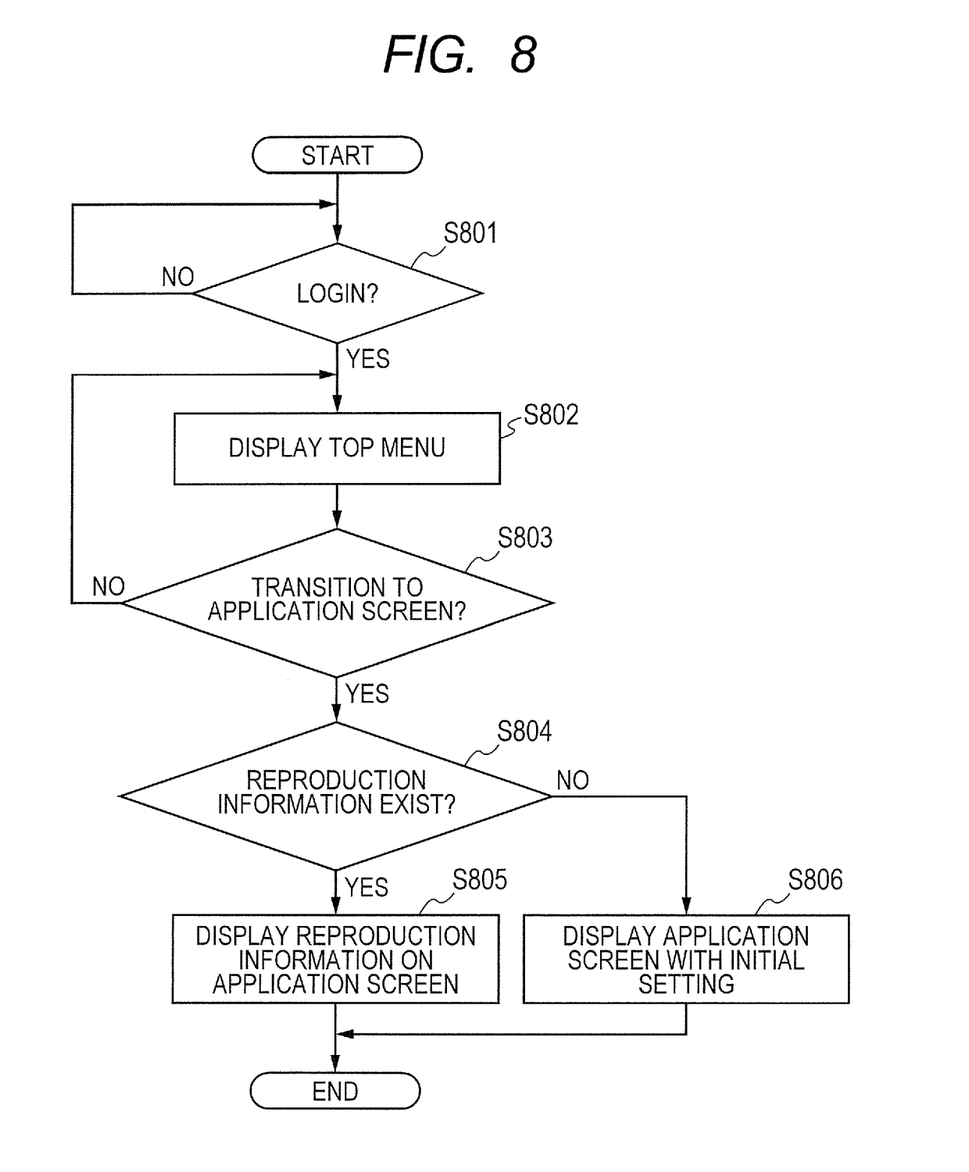
FIG. 8 is a flow chart for describing a process of reproducing the setting of the image processing apparatus.

FIG. 8 is a flow chart for describing a process of reproducing the setting of the image processing apparatus.

In S801, the authentication section 307 performs the authentication of the user.

When the authentication succeeds and thus the user logs in, the authentication section 307 advances the process to S802.

In S802, the operation control section 301 displays the initial screen 500 illustrated in FIG. 5.

In S803, the operation control section 301 determines whether or not there is an instruction for displaying the application screen. Then, when it is determined that there is the instruction for displaying the application screen, the operation control section 301 advances the process to S804.

In S804, the operation control section 301 confirms whether or not the reproduction information which coincides with the user identifier of the user who logged in in S801 exists in the storage control section 304. When it is confirmed that the reproduction information exists, the operation control section 301 determines whether or not the reproduction information corresponding to the display application instructed in S803 exists. When it is determined that the reproduction information exists, the operation control section 301 advances the process to S805. On the other hand, when it is confirmed that the reproduction information does not exist, the operation control section advances the process to S806.

In S805, the operation control section 301 reads the reproduction information confirmed in S804 from the storage control section 304, and reproduces the previous setting on the application screen instructed in S803. Thus, the previously used screen can be automatically reproduced without any user's instruction.

On the other hand, in S806, since it is determined in S804 that the reproduction information does not exist, the operation control section 301 displays as the initial setting the application screen instructed in S803.

That is, in the present embodiment, as illustrated in later-described FIG. 10, the image processing apparatus stores, as the reproduction information, the information for again displaying the application screen which was used, e.g., when the application was completed or the printing was completed, in the storage control section 304. For example, the image processing apparatus stores the discrimination information for discriminating the application and the reproduction information, while associates them with each other. That is, the image processing apparatus stores, for each application, the reproduction information concerning the relevant application. Then, when reproducing the screen based on the reproduction information, the image processing apparatus acquires the related reproduction information based on the discrimination information of the designated application, returns the already-set setting information, and thus reproduces the screen.

Figure 9:
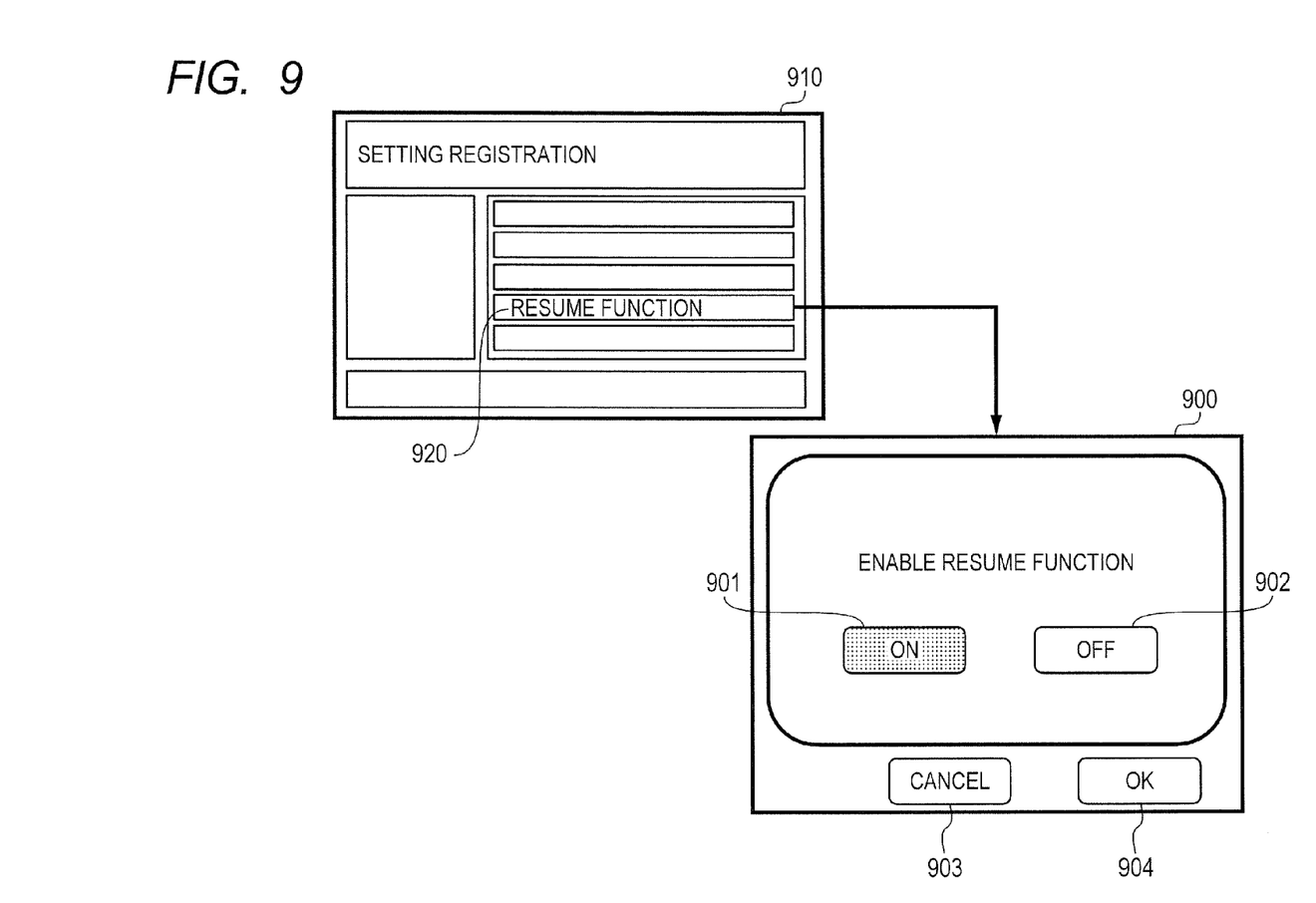
FIG. 9 is a diagram for describing switch setting between a resume function and the auto-clear function.

FIG. 9 is a diagram for describing switch setting between a resume function and the auto-clear function.

When it is detected that the user mode key 406 on the operation unit 203 is pressed, the image processing apparatus displays a setting registration screen 910. Here, the setting registration screen 910 is the screen for registering setting of a device not depending on the function, and default setting in each function. On this screen, the items capable of being set in the setting registration are displayed in a list form. As one of the displayed items, an item 920 of the resume function is displayed. When it is detected that this item is selected, the image processing apparatus displays a screen 900 for setting the resume function. Further, the image processing apparatus displays this screen while reflects the states (ON/OFF) of the setting which uses the resume function. The illustrated example shows that a state "ON" 901, which is being set, is highlighted as reversal display or color-changed display, and a state "OFF" 902 is displayed under a normal condition (non-reverse condition or non-highlighted condition). If an item not set is selected, the display form is reversed. When it is detected that an OK button 904 is pressed, the image processing apparatus reflects the set content. On the other hand, when it is detected that a CANCEL button 903 is pressed, the image processing apparatus closes the screen 900 without reflecting the set content, and the screen is returned to the setting registration screen 910.

Figure 10:
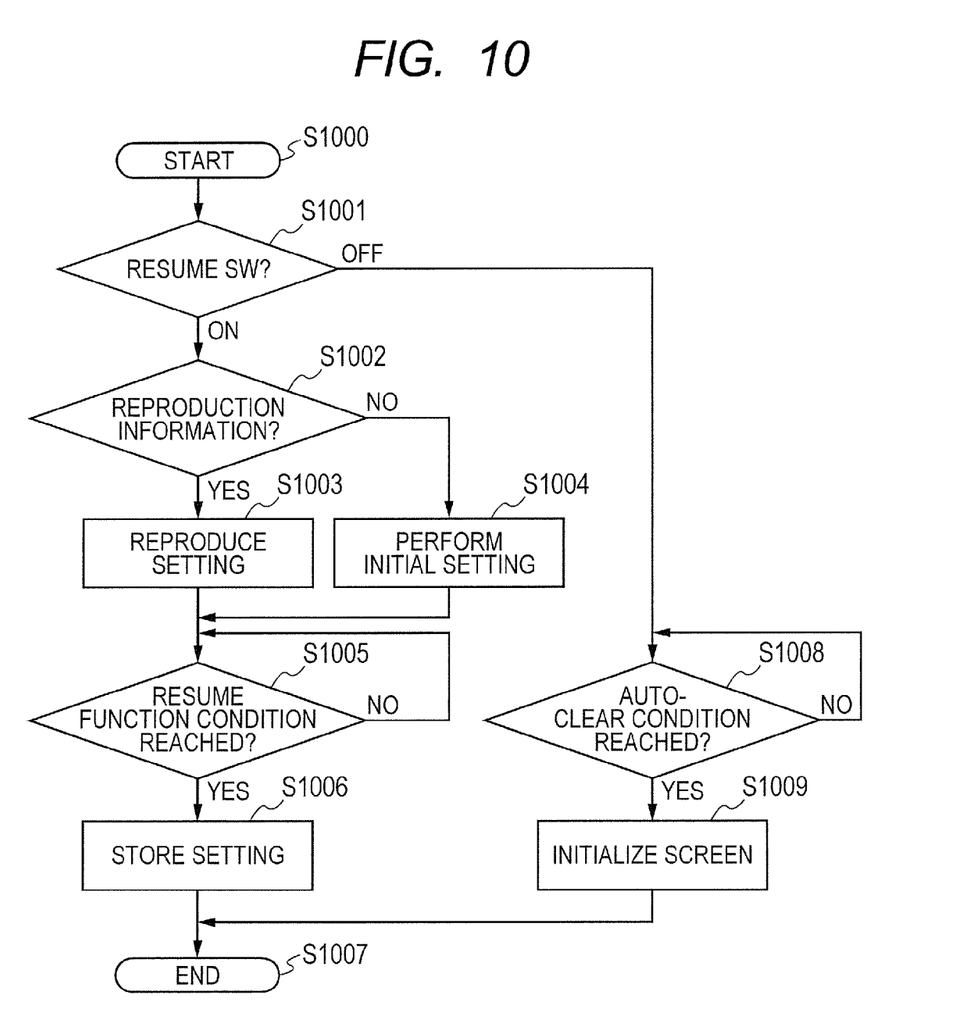
FIG. 10 is a flow chart for describing an example of an information process to be performed at the time of the switch setting between the resume function and the auto-clear function.

FIG. 10 is a flow chart for describing an information process to be performed at the time of the switch setting between the resume function and the auto-clear function.

When any screen other than the initial screen is being displayed, the process is started from a step S1000.

In a step S1001, the image processing apparatus acquires ON/OFF states concerning whether or not to enable the resume function set on the screen 900 (represented as "RESUME SW?" in S1001).

When the resume function is "OFF" ("OFF" in S1001), the auto-clear function is enabled, and the image processing apparatus advances the process to a step S1008. In the step S1008, the image processing apparatus determines whether or not the auto-clear condition is reached. Then, when it is determined that the auto-clear condition is reached ("YES" in S1008), the image processing apparatus advances the process to a step S1009. Here, the auto-clear condition includes, for example, a condition that an operation is not performed for a predetermined certain period of time, a condition that an application is switched, a condition that the user is changed, or the like.

In the step S1009, the image processing apparatus initializes the display screen, and the screen is transitioned to the initial screen. Then, the image processing apparatus completes the process illustrated in FIG. 10 (step S1007).

When the resume function is "ON" ("ON" in S1001), the image processing apparatus determines in a step S1002 whether or not the reproduction information related to the previously stored setting exists. When it is determined that the reproduction information exists ("YES" in S1002), the image processing apparatus reads the stored reproduction information and transitions, in a step S1003, the screen to the screen on which the previous setting is reproduced. On the other hand, when it is determined that the reproduction information does not exist ("NO" in S1002), the image processing apparatus transitions the screen to the initial screen in a step S1004. After then, the usual process is performed.

Next, in a step S1005, the image processing apparatus determines whether or not the condition of the resume function is reached. Here, it should be noted that the condition of the resume function includes, for example, a condition that the application related to the displayed screen is completed, or the like. More specifically, it may be possible to properly set the condition of the resume function to the setting file of the disk 211 or the like. In this case, the image processing apparatus may perform the determination in the step S1005 based on whether or not the condition described in the setting file is reached. In any case, when it is determined that the condition of the resume function is reached ("YES" in S1005), the image processing apparatus advances the process to a step S1006. On the other hand, when it is determined that the condition of the resume function is not reached ("NO" in S1005), the image processing apparatus repeats the process in the step S1005.

In the step S1006, the image processing apparatus stores the reproduction information which is the setting information for the resume function. As described above, for example, the image processing apparatus stores (or memorizes) the reproduction information while associates it with the discrimination information for discriminating the application. Then, the image processing apparatus completes the process illustrated in FIG. 10 (step S1007).

<Second Embodiment>

In the first embodiment, the switch setting between the resume function and the auto-clear function is performed irrespective of the function. In the second embodiment, the switch setting between the resume function and the auto-clear function can be performed for each function. Hereinafter, the present embodiment will be described with reference to FIGS. 9 and 11.

Figure 11:
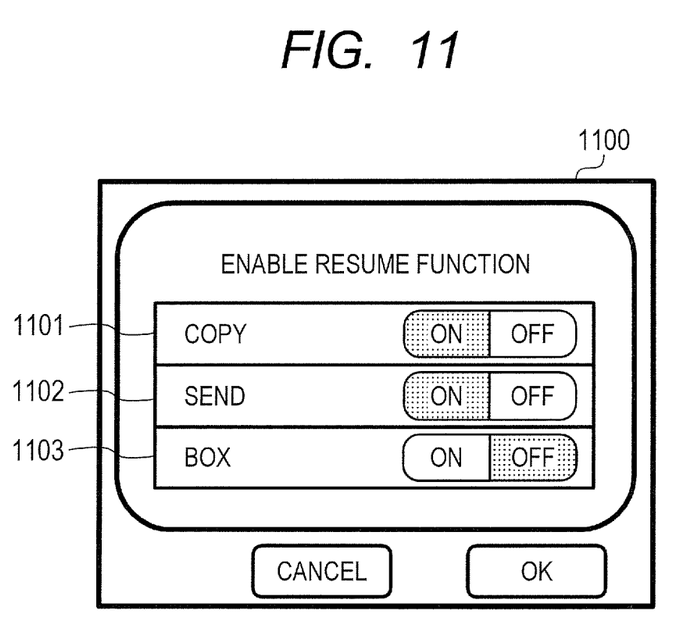
FIG. 11 is a diagram illustrating an example of a screen by which the switch setting between the resume function and the auto-clear function can be performed for each function.

When it is detected that the user mode key 406 on the operation unit 203 is pressed, the image processing apparatus displays the setting registration screen 910. Then, when it is detected that the item 920 of the resume function displayed in the list form on the screen is selected, the image processing apparatus displays a screen 1100 for setting the resume function. According to the present embodiment, it is possible to select and set whether or not the resume function is enabled for each of a copy function 1101, a send function 1102 and a box function 1103.

Moreover, in FIG. 9 of the first embodiment and FIG. 11 in the second embodiment, the setting as to whether or not the resume function is enabled has been described. However, it may be possible to set whether or not the auto-clear function is enabled. Namely, when the resume function and the auto-clear function are in an exclusive relationship by the setting, it is possible to have the effect same as that described above.

<Other Embodiments>

Besides, it is also possible to achieve the present invention by performing a process of supplying software (program) to achieve the functions of the above embodiment to a system or an apparatus through a network or various storage media and causing a computer (or a CPU or an MPU) of the system or the apparatus to read out and execute the supplied program.

As just described, according to the embodiments of the present invention, it is possible to exclusively enable both the resume function and the auto-clear function.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-117802, filed Jun. 4, 2013, which is hereby incorporated by reference herein in its entirety.

What is claimed is:

1. An image processing apparatus comprising:
an auto-clear unit configured to perform a screen transition from a screen of an application on an operation unit to an initial screen and initialize the application in a case where a certain period of time elapses without input from a user while the screen is being displayed on the operation unit;
a resume unit configured to store information of the application input by the user on the screen being displayed in a storage unit in a case where the operation of the application for the screen being displayed on the operation unit is completed, and call up the information stored in the storage unit when the user again uses the application;
a setting unit configured to enable the resume unit; and
a switching unit configured to disable the auto-clear unit in accordance with the setting unit enabling the resume unit.

2. The image processing apparatus according to claim 1, wherein
the setting unit sets, for each of a plurality of applications, whether or not to enable the resume unit for reproducing the setting based on the setting information stored in relation to each application, and
the switching unit disables the auto-clear unit in accordance with the setting unit enabling the resume unit.

3. The image processing apparatus according to claim 1, wherein the setting unit is also configured to set whether or not to enable the auto-clear unit, wherein
in a case where the setting unit is set to enable the auto-clear unit, the switching unit enables the auto-clear unit, and
in a case where the setting unit has not been set to enable the auto-clear unit, the switching unit enables the resume unit.

4. The image processing apparatus according to claim 3, wherein
the setting unit sets, for each of a plurality of applications, whether or not to enable the auto-clear unit for reproducing the setting based on the setting information stored in relation to each application, and
the switching unit switches from the operation to enable either one of the resume unit and the auto-clear unit to the operation to enable the other of the resume unit and the auto-clear unit, in accordance with enablement or disablement of the auto-clear unit for each application by the setting unit.

5. The image processing apparatus according to claim 1, the setting unit sets, for each of a plurality of applications, whether or not to enable the resume unit for reproducing the setting based on the setting information stored in relation to each application, and
further comprising the storage unit, wherein the storage unit is configured to store the setting information set for each application, and wherein the resume unit reproduces the setting based on the setting information corresponding to a designated application.

6. An information processing method to be performed by an image processing apparatus, the method comprising:
an auto-clear step of performing a screen transition from a screen of an application on an operation unit to an initial screen and initializing the application in a case where a certain period of time elapses without input from a user while the screen is being displayed on an operation unit;
a resume step of storing information of the application input by the user on the screen being displayed in a storage unit in a case where the operation of the application for the screen being displayed on the operation unit is completed, and calling up the information stored in the storage unit when the user again uses the application;
a setting step of enabling the resume step; and
a switching step of disabling the auto-clear step in accordance with enabling the resume step in the setting step.

7. A non-transitory computer-readable storage medium of storing a program to cause a computer to function as:
an auto-clear unit configured to perform a screen transition from a screen of an application on an operation unit to an initial screen and initialize the application in a case where a certain period of time elapses without input from a user while the screen is being displayed on the operation unit;
a resume unit configured to store information of the application input by the user on the screen being displayed in a storage unit in a case where the operation of the application for the screen being displayed on the operation unit is completed, and call up the information stored in the storage unit when the user again uses the application;
a setting unit configured to enable the resume unit; and
a switching unit configured to disable the auto-clear unit in accordance with the setting unit enabling the resume unit.

* * * * *